United States Patent [19]

Schmitz et al.

[11] Patent Number: 4,522,997
[45] Date of Patent: Jun. 11, 1985

[54] CROSSLINKING AGENTS FOR WATER-SWELLABLE POLYMERS

[75] Inventors: Hermann Schmitz, Frankfurt; Klaus Kühlein, Kelkheim, both of Fed. Rep. of Germany

[73] Assignee: Cassella Aktiengesellschaft, Frankfurt, Fed. Rep. of Germany

[21] Appl. No.: 501,537

[22] Filed: Jun. 6, 1983

[30] Foreign Application Priority Data

Jul. 8, 1982 [DE] Fed. Rep. of Germany ....... 3225555

[51] Int. Cl.³ .......................................... C08F 226/00
[52] U.S. Cl. ................................... 526/264; 128/156; 204/159.22
[58] Field of Search .............................. 526/263, 264; 204/159.22

[56] References Cited

U.S. PATENT DOCUMENTS 4,361,689 11/1982 Patel et al. ........................... 526/264

Primary Examiner—Harry Wong, Jr.
Attorney, Agent, or Firm—Connolly and Hutz

[57] ABSTRACT

Crosslinked, water-swellable copolymers are produced with a crosslinking agent comprising an N-(2'alkenyl)-3-methylenepyrrolidin-2-one of the formula

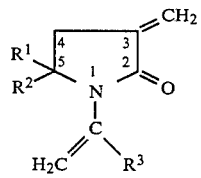

wherein $R^1$, $R^2$ and $R^3$ are the same or different and each is hydrogen or alkyl having 1 to 6 carbon atoms.

7 Claims, No Drawings

CROSSLINKING AGENTS FOR WATER-SWELLABLE POLYMERS

The invention relates to the use of an N-(2'-alkenyl)-3-methylenepyrrolidin-2-one of the general formula I

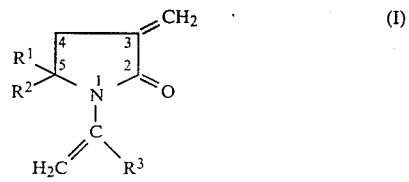

wherein $R^1$, $R^2$ and $R^3$ denote hydrogen or alkyl radicals, as a crosslinking agent for polymers, in particular water-swellable polymers. The invention also relates to the crosslinked, water-swellable polymers prepared using crosslinking agents of the general formula I.

The preparation of crosslinked, water-swellable polymers and their use has been described in detail in numerous patents and in the technical literature. As substances which absorb liquids, so-called super-absorbents, they are chiefly used in hygiene articles, such as, for example, nappies, bandages and tampons. Thus, thickening agents which are used for faecal matter and/or urine excreted through artificial outlets and which are characterised in that they contain at least one crosslinked polymer which is still just soluble in water are known from DE-A1 2,706,135 (corresponding to U.S. Pat. No. 4,179,367). Suitable polymers mentioned are, interalia, those based on acrylic acid, methacrylic acid, acrylamide, methacrylamide, acrylonitrile or methacrylonitrile, for example homopolymers of salts of acrylic and/or methacrylic acid or copolymers of at least two acrylic monomers with one another or copolymers of at least one acrylic monomer and vinlypyrrolidone. The use of crosslinked, water-swellable polymers, also called hydrocolloids, in the hygiene sector is also described in DE-A2 1,642,072 (corresponding to U.S. Pat. No. 3,670,731) and DE-A1 1,617,998 (corresponding to U.S. Pat. Nos. 3,669,103 and 3,810,468). Besides acrylamide polymers, polystyrene polymers, for example, are also mentioned. Copolymers based on, for example, 2-methyl-2-acrylamido-propanesulphonic acid (=MAPS) or diethylvinylphosphonate and vinyl-N-methyl-acetamide or vinylformamide and acrylamide or methacrylamide have also already been proposed as outstanding superabsorbents (German Patent Application P 31 24 454.8) (corresponding to European Patent Applicaton 068,159).

Divinyl compounds which in most cases have two acrylamide radicals, such as, for example, methylenebisacrylamide (=MBA), ethylenebisacrylamide (=EBA, 1,2-bis-acrylamidoethane), bis-(acrylamido-methyl)ether (=BAME) and bis-acrylamido-acetic acid (=BAA) are as a rule used as the crosslinking agents in the preparation of such crosslinked, water-swellable polymers. Bis-vinylphosphonic acid glycol ester has also already been proposed as a crosslinking agent (German Patent Application P 31 24 454.8). The preparation of the crosslinked, water-swellable polymers, for example by free radical or redox polymerisation, is known.

Surprisingly, it has now been found that the compounds of the formula I are outstandingly suitable as crosslinking agents for polymers, especially water-swellable polymers.

If compounds of the formula I are used as crosslinking agents in the preparation of water-swellable, crosslinked polymers in a manner which is known per se, polymers with significantly superior properties, for example retention capacity, to the products known hitherto are obtained.

The identical or different alkyl radicals $R^1$, $R^2$ and $R^3$ in the general formula have as a rule 1 to 6, in particular 1 to 4, C atoms. The $R^1$, $R^2$ and $R^3$ radicals preferably represent methyl, that is to say the use of the compound N-(2-propenyl)-5,5-dimethyl-3-methylene-pyrrolidin-2-one is particularly preferred. This known compound can easily be prepared in reasonable yields by the process described in Tetrahedron Letters volume 21, 119–120 (1980). The remaining compounds of the general formula I can be prepared analogously.

Examples of olefinic monomers which are suitable, in the context of the present invention, for the preparation of water-swellable polymers are: acrylic and methacrylic acid and their salts, such as sodium, potassium or ammonium acrylate, acrylamide, methacrylamide, acrylonitrile, vinylsulphonic acid, styrenesulphonic acid, vinylphosphonic acid, dimethyl, diethyl, dipropyl and dibutylvinylphosphonate, 2-methyl-2-acrylamido-propane-1-sulphonic acid and 2-methyl-2-acrylamido-propane-1-phosphonic acid, N-vinylformamide, N-vinylacetamide, N-vinyl-propionamide, N-vinyl-N-methylformamide, N-vinyl-N-methylacetamide, N-vinyl-N-methylpropionamide, N-vinyl-N-ethylformamide, N-vinyl-N-ethylacetamide, N-vinyl-N-ethylpropionamide and N-vinylpyrrolid-2-one. Acrylic acid and its salts and acrylamide are also particularly suitable for the preparation of crosslinked, water-swellable homopolymers, whilst the other monomers are above all suitable for the preparation of crosslinked, water-swellable copolymers, in particular in combination with acrylamide and/or methacrylamide. However, it is, of course, also possible to copolymerise, for example, acrylic acid and its salts with other olefinic monomers, in particular acrylamide.

The polymerisation (which, also in the test which follows, is always to be understood as homopolymerisation or copolymerisation) is carried out in the presence of one or more compounds of the formula I, which act as crosslinking agents. The concentration of the compound or compounds of the formula I is 0.001 to 2% by weight, preferably 0.02 to 0.5% by weight, based on the other monomers. Where relevant, one or more other compounds which act as crosslinking agents, such as, for example, bis-acrylamido-methane, bis-acrylamido-acetic acid, 1,1'-bis-acrylamido-dimethyl ether, bis-vinyl-phosphonic acid glycol ester, methylenebisacrylamide, ethylenebisacrylamide or bis-(acrylamidomethyl) ether, can also be present, in addition to one or more compounds of the formula I. The polymerisation is otherwise carried out by any desired process, for example by solution, gel, emulsion, suspension or precipitation polymerisation, if necessary under an inert gas atmosphere, such as nitrogen, in a manner which is known per se. The polymerisation is thereby initiated in the conventional manner by high-energy radiation or by free radical or redox catalysts, and is carried out at 0° to 130° C., under normal pressure or, if necessary, under increased pressure, preferably at 10° to 100° C. The monomer concentration is usually 15 to 50% by weight, preferably 20 to 30% by weight. In the case of solution polymerisation, examples of solvents which can be used are water and hydrocarbon distillates having a boiling point of 250° to 350° C., preferably 280° to 320° C., and in the case of emulsion polymerisation, for example, mixtures of water and these hydrocarbon distillates can be used. When the polymerisation has ended, the crosslinked, water-swellable (mono- or co-) polymer is isolated in the conventional manner and, if necessary, dried.

If the monomers to be polymerised contain hydrolysable groups, partial hydrolysis can also be carried out after, but advantageously during, the polymerisation. For this, an alkaline hydrolysing agent is additionally added to the monomer mixture. In principle, any water-soluble base of sufficient strength for reaction with the hydrolysable groups, such as, for example, alkali metal and alkaline earth metal hydroxides, alkali metal or ammonium salts of weak acids which generate $OH^{\ominus}$ ions by hydrolysis, ammonia or strongly basic aliphatic amines, can be used as the hydrolysing agent. Sodium hydroxide or potassium hydroxide, ammonia, sodium carbonate, bicarbonate, phosphate, borate or acetate or potassium carbonate, bicarbonate, phosphate, borate or acetate is advantageously used as the hydrolysing agent. If the partial hydrolysis is only to be carried out after the polymerisation, the hydrolysing agent is mixed with the polymer. Thus, depending on the procedure, the hydrolysis takes place already during the polymerisation, which usually proceeds exothermically, or by further provision of heat after the polymerisation. A combination of both procedures is also possible.

The polymerisation is frequently carried out in water. For this, the monomers to be polymerised are dissolved in water, the monomer concentration being as a rule 15–50% by weight, preferably 20–30% by weight, acid groups present, such as, for example, in the case of acrylic acid, are converted in the salt form by addition of alkali, such as sodium hydroxide solution, potassium hydroxide solution or ammonia, and the polymerisation or copolymerisation is initiated in a manner which is known per se, for example by addition of a catalyst, and is carried out under normal or increased pressure, if necessary under an inert gas atmosphere, at 0° to 130° C., preferably 10°–100° C. Under conditions of solution polymerisation, polymers according to the invention which are water-insoluble but are greatly swollen in water are thus obtained, and can be isolated by distilling off the water or by precipitation by addition of a water-miscible organic solvent, such as methanol, ethanol, acetone or the like.

Particularly effective polymers according to the invention are obtained if the polymerisation is carried out in water by the so-called gel polymerisation process. For this, 15–50% strength by weight, preferably 20–30% strength by weight, aqueous solutions of the monomers containing known suitable catalyst systems and, if appropriate, one of the hydrolysing agents mentioned, are polymerised without mechanical mixing, utilising the so-called Trommsdorff-Norrisch effect (Bios Final Rep. 363 22; Makromol. Chem. 1, 169 (1947)). In this case also, the polymerisation reaction is carried out in the temperature range between 0° C. and 130° C., preferably between 10° C. and 100° C., either under normal pressure or under increased pressure and, if appropriate, under an inert gas atmosphere, preferably under nitrogen. The quality characteristics of the polymers can be further improved by subsequently heating the polymer gels in the temperature range of 50°–130° C., preferably 70°–100° C., for several hours. The polymers according to the invention which are prepared in this way and are in the form of aqueous jellies can be obtained in a solid form after removal of the water by known drying processes, and converted into powder form with generally known grinding units.

The water-swellable, crosslinked polymers according to the invention can also be prepared, for example, by the method of precipitation polymerisation in an organic solvent, in particular in a water-soluble alkanol, that is to say in a $C_1$- to $C_4$-alcohol, such as methanol, ethanol, isopropanol, n-, sec.- or isobutanol or, preferably, tert.-butanol. The water content of the lower alkanols used as solvents should in this case not exceed 6% by weight, since otherwise formation of lumps may occur during the polymerisation. The water content is preferably 0–3%. The amount of solvent to be employed depends to a certain degree on the nature of the monomers used. As a rule, 200 to 1,000 g of the solvent are employed per 100 g of total monomers. As is usual, the polymerisation can be carried out in an inert gas atmosphere, preferably under nitrogen. The polymerisation temperature is between 20° and 120° C., and is preferably 40° to 80° C. When the polymerisation is carried out in the organic solvents mentioned, preferably in tert.-butanol, under the conditions of precipitation polymerisation, the polymer is obtained directly in solid form, and can be isolated by distilling off the solvent or by filtration with suction and drying. The crosslinked polymer thus prepared can also be partially hydrolysed in suspension at room temperature or elevated temperature, before being isolated, by addition of the abovementioned hydrolysing agents, preferably NaOH or KaOH.

As is generally customary, high-energy electromagnetic radiation or chemical polymerisation initiators are used to trigger off the polymerisations. Examples of the latter compounds are organic peroxides, such as benzoylperoxide, tert.-butyl hydroperoxide, methyl ethyl ketone peroxide and cumene hydroperoxide, azo compounds, such as azo-diisobutyronitrile, inorganic peroxy compounds such as $(NH_4)_2S_2O_8$ or $K_2S_2O_8$ or $H_2O_2$, if appropriate in combination with reducing agents, such as sodium bisulphite, or redox systems which contain, as the reducing component, an aliphatic and aromatic sulphinic acid, such as benzenesulphinic acid and toluenesulphinic acid and derivatives of these acids, such as, for example, Mannich adducts of sulphinic acid, aldehydes and amino compounds, such as are described in German Patent Specification 1,301,566. As a rule, 0.03 to 2 g of the polymerisation initiator are employed per 100 g of total monomers.

The crosslinked, water-swellable mono- or co-polymers prepared according to the invention probably have the following structure, shown schematically:

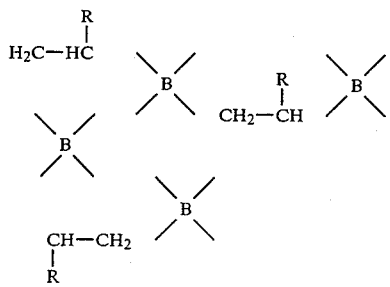

in which the zig-zag lines represent the main polymer strands or the base chains and B represents crosslinking bridge members, which are probably attributed the general formula Ia,

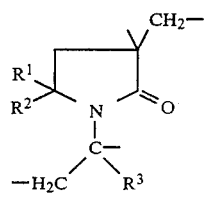

wherein $R^1$, $R^2$ and $R^3$ have the meanings already given. The main polymer strands or base chains contain side chains or side radicals —R, such as, for example, —$CONH_2$, —COONa, —$SO_3Na$, —NCHO —PO($OC_2H_5$)$_2$ or —N($CH_3$)$COCH_3$. In the case of copolymers, the various monomer units are usually arranged in random distribution within the main polymer strands.

The crosslinked, water-swellable homo- or copolymers according to the invention which contain one or more compounds of the formula I or radicals of the formula Ia have significantly better properties than the particular comparison products which have been obtained with the crosslinking agents hitherto conventional, in particular a significantly better swelling power and hence also a better retention capacity for liquids. They therefore bind more liquid per unit weight than the comparable products hitherto known or proposed, and are thus superior as absorbent substances (so-called super-absorbent), for example in hygiene articles, such as nappies, sanitary towels, tampons, paper handkerchiefs and the like, to the products hitherto used, and they are distinguished by a high absorbency for physiological and electrolyte-containing liquids, such as, for example, blood, urine, perspiration and the like. Particularly advantageous properties for this purpose are shown by homopolymers of acrylic acid which has been neutralised with sodium and/or potassium hydroxide solution or ammonia before the start of polymerisation, and copolymers of acrylic acid and acrylamide in a weight ratio of (20 to 80) : (80 to 20), the acrylic acid in this case also having been neutralised with the above-mentioned bases before the start of polymerisation.

The crosslinked, water-swellable polyacrylate according to the invention thus contains units having the structure

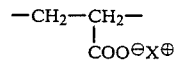 (II)

wherein $X^\oplus$ denotes a cation, in particular $Na^\oplus$ or $K^\oplus$, in the main polymer strands, and the copolymer of acrylic acid and acrylamide in a weight ratio of (20 to 80) : (80 to 20) which has been crosslinked according to the invention contains units having the structures

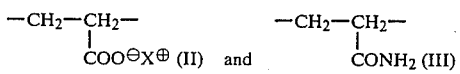

in the main polymer strands, the units having the structures II and III being arranged randomly, in the context of the overall weight ratio, in the main polymer strands in the copolymer. $X^\oplus$ can also be a proton or, in particular a cation of the formula $HNR_3^9{}^\oplus$, wherein the 3 radicals $R^9$ are identical or different and denote hydrogen, alkyl with 2 to 4 carbon atoms, hydroxyethyl or hydroxypropyl. Very particularly advantageous properties in this context are shown by copolymers which consist of 0 to 60% by weight of radicals of the formula IV

0 to 40% by weight of radicals of the formula V

and 10 to 95% by weight of radicals of the formula VI

in random distribution in the base chains, the sum of the proportions of radicals of the formulae IV and V being 5 to 90% by weight, and which additionally contain 0.001 to 2% by weight, based on the total weight of the base chain constituents, of crosslinking bridge members of the formula Ia, wherein, in the formula Ia, $R^1$, $R^2$ and $R^3$ have the meanings already given, but preferably denote methyl, and wherein $R^4$ denotes a radical of the formulae —CONH—C($CH_3$)$_2$—$CH_2$—$SO_3^\ominus X^\oplus$, —CO—NH—C($CH_3$)$_2$—$CH_2$—$PO_3^{\ominus\ominus} X_2^\oplus$, —$SO_3^\ominus X^\oplus$, —$PO_3^{\ominus\ominus} X_2^\oplus$ or

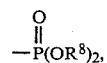

$R^5$ and $R^6$ are identical or different and represent hydrogen, methyl or ethyl or together represent trimethylene, $R^7$ denotes hydrogen or methyl, $R^8$ denotes alkyl with 1 to 4 C atoms and $X^\oplus$ denotes a cation. These copolymers are preferred in the context of the present invention. Partial hydrolysis products of the preferred copolymers in which a proportion of up to 60% of the groups of the formula V originally present has been hydrolysed to form groups of the formula II

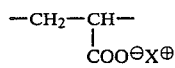
(II)

the products containing a total of 10 to 90% by weight of groups of the formulae II and IV which contain anionic radicals, are also outstandingly suitable.

The base chains in the preferred water-swellable, crosslinked polymers preferably consist of 0 to 50% by weight of radicals of the formula IV, 0 to 30% by weight of radicals of the formula V and 20 to 95% by weight of radicals of the formula VI, in random distribution. The preferred copolymers preferably contain 0.02 to 0.5% by weight, based on the total weight of the base chain constituents, of crosslinking bridge members of the formula Ia.

The cation $X^\oplus$ can be a proton, or can be derived from any water-soluble known base which is of sufficient strength to neutralise the sulpho and carboxyl groups and does not impair the water-swellability of the copolymers. The choice is thus easy to make. However, $X^\oplus$ advantageously denotes a proton or an alkali metal cation, in particular a sodium or potassium cation, or a cation of the formula $HN^\oplus R^9$, wherein the three radicals $R^9$, as already mentioned, are identical or different and represent hydrogen, alkyl with 1 to 4 C atoms, hydroxyethyl or hydroxypropyl.

The base chains of particularly preferred copolymers according to the invention consist of 0 to 50% by weight of radicals of the formula IV, 0 to 30% by weight of radicals of the formula V and 20 to 95% by weight of radicals of the formula VI, or hydrolysis products thereof, in random distribution. Those copolymers according to the invention in which $R^7$ is hydrogen are also preferred. In particular, the preferred crosslinked copolymers according to the invention contain 0.02 to 0.5% by weight of radicals of the formula Ia, based on the total weight of the base chain constituents.

Particularly preferred copolymers according to the invention contain radicals of the formula IV in which $R^4$ denotes the radical —CO—NH—C(CH$_3$)$_2$—CH$_2$—SO$_3^\ominus$Na$^\oplus$, and/or

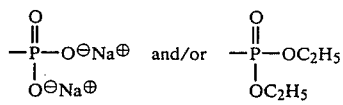

and/or radicals of the formula V in which $R^5=R^6=H$, or $R^5=R^6=CH_3$, or $R^5=H$ and $R^6=CH_3$.

In the derivatives obtainable by partial hydrolysis of the preferred copolymers according to the invention, an amount of up to 60%, preferably 10–40%, of the radicals of the formula VI originally present is replaced by radicals of the formula II. Advantageously, a higher degree of hydrolysis, in the context of this range, is chosen, the lower the sulphonic acid or phosphonic acid content in the copolymer, and vice versa. In particular, partial hydrolysis products of the preferred copolymers according to the invention contain a total of 20 to 80% by weight of groups of the formulae II and IV. The radicals $R^4$ to $R^9$ and $X^\oplus$ can, of course, have different meanings in one copolymer.

The very good absorption capacity of the preferred copolymers according to the invention, and of their partial hydrolysis products, for physiological and electrolyte-containing liquids is in many cases increased still further by the presence of borate anions. Such copolymers containing borate anions, and their partial hydrolysis products, as a rule contain 2.5 to 35% by weight, preferably 5 to 25% by weight, of borate anions, calculated as H$_3$BO$_3$ and based on the weight of non-hydrolysed polymer.

The preferred water-swellable, crosslinked copolymers according to the invention are obtained by dissolving 0 to 60 parts by weight of a vinyl compound of the formula IVa

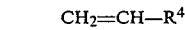

(IVa)

in water, neutralising the compound, if it contains sulphonic or phosphonic acid groups, and then adding 0 to 40 parts by weight of a vinyl compound of the formula Va

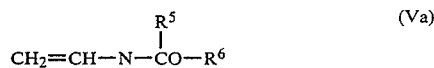

and 10 to 95 parts by weight of acrylamide and/or methacrylamide, the total amount of the vinyl compounds of the formulae IVa and Va being 5 to 95 parts by weight and the total amount of acrylamide and/or methacrylamide and the vinyl compounds of the formula IVa and Va being 100 parts by weight, additionally adding 0.001 to 2 parts by weight of one or more crosslinking agents of the formula I, wherein $R^4$, $R^5$, $R^6$ and $X^+$ have the abovementioned meaning and initiating the copolymerisation in a manner which is known per se and carrying it out at 0° to 130° C., preferably 10°–100° C.

The preferred copolymers can also be prepared by all the known polymerisation processes, such as the solution, gel, suspension, emulsion or precipitation polymerisation process. Partial hydrolysis which is desired is carried out as already described.

The preferred products, which in many cases are advantageous, containing borate anions can be obtained in a simple manner by using sodium salts or potassium salts of borate acid (ortho-, meta- or polyborates or borate acid together with NaOH or KOH) as hydrolysing agents. During the partial hydrolysis, it is not absolutely necessary, although it is as a rule customary, to use an amount of hydrolysing agent equivalent to the amount of groups to be hydrolised. On the one hand, NH$_3$ is liberated during the hydrolysis, and can in turn catalyse the hydrolysis of further amide groups, and on the other hand, the pH value of the buffer system formed from carboxyl groups and carboxylate groups in the copolymer is likewise sufficient for further hydrolysis of amide groupings.

Particularly preferred copolymers according to the invention are obtained if, under the abovementioned pre-conditions, 0 to 50 parts by weight of vinyl compounds of the formula IVa, 0 to 30 parts by weight of vinyl compounds of the formula Va and 10 to 95 parts by weight of acrylamide and/or methacrylamide are used.

Particularly preferred products according to the invention are also obtained if 0.02 to 0.5 part by weight of crosslinking agents of the formula I is used.

Particularly advantageous partially hydrolysed preferred copolymers according to the invention are obtained if enough vinyl compounds of the formula IVa containing anionic groups are used and the hydrolysis is continued until the products contain a total of 20 to 80% by weight of groups of the formulae II and IV containing anionic radicals.

Possible compounds of the formula IVa are: vinylsulphonic acid, vinylphosphonic acid, dimethyl, diethyl, dipropyl and dibutyl vinyl phosphonate, 2-methyl-2-acrylamidopropane-1-sulphonic acid and 2-methyl-2-acrylamidopropane-1-phosphonic acid, and possible compounds of the formula Va are: N-vinylformamide, N-vinylacetamide, N-vinylpropionamide, N-vinyl-N-methylformamide, N-vinyl-N-methylacetamide, N-vinyl-N-methylpropionamide, N-vinyl-N-ethylformamide, N-vinyl-N-ethylacetamide, N-vinyl-N-ethylpropionamide and N-vinylpyrrolidone.

Besides acrylamide and, if appropriate, methacrylamide, the base chains are preferably built up from 2-methyl-2-acrylamidopropanesulphonic acid, vinylphosphonic acid, diethyl vinyl phosphonate, vinylformamide, vinylacetamide, vinylmethylacetamide and vinylpyrrolidone, and, as the crosslinking component, preferably N-(2-propenyl)-5,5-dimethyl-2-methylenepyrrolidin-2-one.

In the examples which follow, those labelled a in each case relate to the preparation of polymers using, according to the invention, compounds of the formula I as crosslinking agents, and those labelled b relate to the preparation of comparison polymers. Unless otherwise indicated, percentages are by weight.

The following abbreviations are used in the examples and in Table 1:

ABAH: 2,2-Azo-bis(2-amidopropane) dihydrochloride
ABN: Azo-bisisobutyronitrile
AM: Acrylamide
APS: Ammonium persulphate
BAA: Bis-acrylamidoacetic acid
BAME: Bis-(acrylamidomethyl) ether
BVPG: Bis-(vinylphosphonic acid) glycol ester
EBA: Ethylene-bis-acrylamide=1,2-bis-(acrylamido)-ethane
PPS: Potassium persulphate
MAM: Methacrylamide
MAPS: 2-Methyl-2-acrylamidopropanesulphonic acid
MBA: Methylene-bis-(acrylamide)
Na-VS: Sodium vinylsulphonate
PMP: N-(2'-propenyl)-5,5-dimethyl-3-methylenepyrrolidin-2-one
ViFA: Vinylformamide
VipDi: Vinylphosphonic acid diethyl ester
ViMA: N-vinyl-N-methylacetamide
Vipy: N-vinylpyrrolid-2-one

EXAMPLE 1a 200 g of acrylic acid are slowly added dropwise to 222.2 g of 50% strength sodium hydroxide solution in 341.8 g of demineralised water, with external cooling, the internal temperature being kept below 35° C., in a polymerisation flask of 2 liters capacity and equipped with a lid with a ground glass joint, a stirrer, a thermometer and a gas inlet tube. After the mixture has been cooled to 20° C., 0.02 g of PMP are added and are dissolved in the course of 30 minutes, while stirring and passing in nitrogen. 120 mg of APS—dissolved in 5 ml of water—are now added, and the mixture is stirred at a high speed for another 3 minutes, while passing in nitrogen. The inlet tube and stirrer are then lifted up. After an induction time of about 30 minutes, the polymerisation starts, whereupon the internal temperature rises to 80° to 85° C. and the solution is transformed into a gel of stable shape. The polymer is comminuted, dried and brought to the desired particle size by grinding.

EXAMPLE 1b

An Na polyacrylate is prepared according to the same instructions as in Example 1a, but with 0.1 g of BVPG as the crosslinking agent instead of PMP.

EXAMPLE 2a 1,200 liters of tert.-butanol are initially introduced into a polymerisation flask of 2 liters capacity and equipped with a stirrer, a reflux condenser, a dropping funnel, a gas inlet tube and an electrically heated water bath, 60 g of MAPS are suspended therein, while stirring, 6.6 liters of $NH_3$ gas are then passed in and 130 g of acrylamide, 10 g of ViMA and 0.2 g of PMP are subsequently added. While passing in nitrogen, the reaction mixture is heated to 50° C. with the electric water bath and 500 mg of ABN are added. After induction time of about 2 hours, the polymerisation starts, the reaction temperature rises up to about 70° C. and the polymer precipitates. The mixture is after-heated at 80° C. for another 2 hours, whereupon a viscous suspension is formed. The polymer can be isolated by filtration with suction and drying in vacuo at 50° C. However, it is also possible to distil off the solvent directly from the reaction mixture under reduced pressure, whereupon the polymer is obtained in the form of a white powder.

EXAMPLE 2b

A copolymer is prepared in accordance with the same instructions as in Example 2a, but with 0.4 g of MBA as the crosslinking agent instead of PMP.

EXAMPLE 3a

An emulsion having the following composition is prepared under nitrogen in an emulsifying flask of 2 liters capacity which has a highly effective stirrer, a gas inlet tube and a bottom valve located over a polymerisation flask: 400 ml of a petroleum fraction with a boiling point range of from 200° to 240° C., 350 ml of demineralised water, 20 g of an emulsifier based on nonylphenol polyglycol ether, 135 g of AM, 50 g of Na-Vs, 15 g of MAPS, 4 g of NaOH and 0.1 g of PMP. About 20% of the emulsion are initially introduced into the polymerisation flask, which is provided with a stirrer, a reflux condenser, a dropping funnel, a gas inlet tube, an electrically heated water bath and an inlet tube from the emulsifying flask. The emulsion is heated to 60° C. while passing in nitrogen and stirring. 20% of a solution of 500 mg of ABAH (method Otsuka Chemical Co. Ltd., Japan) in 50 ml of demineralised water is then added through the dropping funnel. The polymerisation starts after about 30 minutes, with a significant rise in temperature to about 80° C. The remainder of the emulsion is uniformly added dropwise, together with the remaining catalyst solution, in the course of 2 hours. The mixture is then after-heated at 70° C. for another hour. A dispersion of the polymer in the organic solvent, from which the product is isolated as in Example 2, results.

EXAMPLE 3b

A copolymer is prepared in accordance with the same instructions as in Example 3a, but with 0.2 g of BAA as the crosslinking agent instead of PMP.

The polymers in Table 1 can also be prepared according to the above examples.

mer to be investigated, in granular form, is then applied to one half. A stencil is used for this, so that the polymer lies on an area 4×8 cm. The other half of the pad is then folded back, and the towel is wound again in a sealable non-woven fabric of dimensions 20×20 cm, the open ends are sealed by the action of heat energy and the projecting non-woven fabric is cut off. Test articles

TABLE 1

| Number | Monomer composition in % | Crosslinking agent in % of the other monomers | | Further additives in % of the monomers | Base | Catalyst | According to example |
|---|---|---|---|---|---|---|---|
| 4a  | 5 ViMA, 95 AM            | 0.05  | PMP   | 13 K$_2$CO$_3$    | —    | ABAH | 3 |
| 4b  | 5 ViMA, 95 AM            | 0.1   | BAME  | 13 K$_2$CO$_3$    | —    | ABAH | 3 |
| 5a  | 5 ViPDi, 5 MAPS, 90 AM   | 0.02  | PMP   | 13 K$_2$CO$_3$    | NaOH | PPS  | 1 |
| 5b  | 5 ViPDi, 5 MAPS, 90 AM   | 0.025 | MBA   | 13 K$_2$CO$_3$    | NaOH | PPS  | 1 |
| 6a  | 5 ViPDI, 5 MPAS, 90 AM   | 0.1   | PMP   | 13 K$_2$CO$_3$    | NaOH | ABN  | 2 |
| 6b  | 5 ViPDI, 5 MPAS, 90 AM   | 0.1   | BVPG  | 13 K$_2$CO$_3$    | NaOH | ABN  | 2 |
| 7a  | 5 ViPDI, 5 MPAS, 90 AM   | 0.02  | PMP   | 13 K$_2$CO$_3$    | NaOH | ABAH | 3 |
| 7b  | 5 ViPDI, 5 MPAS, 90 AM   | 0.05  | BVPG  | 13 K$_2$CO$_3$    | NaOH | ABAH | 3 |
| 8a  | 5 ViPDI, 5 MPAS, 90 AM   | 0.01  | PMP   | 13 K$_2$CO$_3$    | NaOH | APS  | 1 |
| 8b  | 5 ViPDI, 5 MPAS, 90 AM   | 0.025 | PVBPG | 13 K$_2$CO$_3$    | NaOH | APS  | 1 |
| 9a  | 20 MAPS, 10 ViMA, 70 AM  | 0.02  | PMP   | 4,3 Na borate     | NaOH | APS  | 1 |
| 9b  | 20 MAPS, 10 ViMA, 70 AM  | 0.05  | MBA   | 4,3 Na borate     | NaOH | APS  | 1 |
| 10a | 20 ViMA, 80 AM           | 0.03  | PMP   | 13,3 Na borate    | NaOH | APS  | 1 |
| 10b | 20 ViMA, 80 AM           | 0.05  | BVPG  | 13,3 Na borate    | NaOH | APS  | 1 |
| 11a | 25 MAPS, 5 ViMA, 70 AM   | 0.05  | PMP   | —                 | NaOH | ABAH | 3 |
| 11b | 25 MAPS, 5 ViMA, 70 AM   | 0.1   | BVPG  | —                 | NaOH | ABAH | 3 |
| 12a | 10 ViMA, 90 AM           | 0.05  | PMP   | 13 K$_2$CO$_3$    | —    | APS  | 1 |
| 12b | 10 ViMA, 90 AM           | 0.05  | MBA   | 13 K$_2$CO$_3$    | —    | APS  | 1 |
| 13a | 5 ViFA, 95 AM            | 0.2   | PMP   | 13 K$_2$CO$_3$    | —    | ABN  | 2 |
| 13b | 5 ViFA, 95 AM            | 0.2   | MBA   | 13 K$_2$CO$_3$    | —    | ABN  | 2 |
| 14a | 20 MPAS, 10 ViMA, 70 MAM | 0.05  | PMP   | 4,3 Na borate     | NaOH | APS  | 1 |
| 14b | 20 MPAS, 10 ViMA, 70 MAM | 0.05  | EBA   | 4,3 Na borate     | NaOH | APS  | 1 |

The figures given before the formulae in the above Table denote percentages by weight. The b-series of copolymers given in the Table are those of German Patent Application P 31 24 454.8.

EXAMPLE 15a 100 g of acrylic acid are slowly added dropwise to 111.1 g of 50% strength sodium hydroxide solution in 339.7 g of demineralised water, with external cooling, the internal temperature being kept below 35° C., in a polymerisation flask fo 2 liters capacity and equipped with a lid with a ground glass joint, a stirrer, a thermometer and a gas inlet tube. After the mixture has been cooled to 20° C., 203.3 g of a 49.2% strength by weight AM solution and 0.1 g of PMP are added. Nitrogen is passed into the solution, while stirring, and 120 mg of APS—dissolved in 5 ml of water—are added after 30 minutes. Nitrogen is passed in for another 3 minutes, while stirring, and the inlet tube and stirrer are then lifted up. After an induction of 3–5 minutes, the polymerisation starts, whereupon the internal temperature rises to 80° to 85° C. and the solution is transformed into a gel of stable shape. The polymer is comminuted, dried and brought to the desired particle size by grinding.

EXAMPLE 15b

A copolymer is prepared from AA-Na and AM in accordance with the same instructions as in Example 15a, but with BAA as the crosslinking agent.

The liquid-absorbing action of the copolymers according to the invention in hygiene articles is tested by a centrifuge method with the aid of absorbent articles in the form of sanitary towels.

To prepare the test articles, the covering of commercially available sanitary towels is removed and the flock pad is shortened so that it weighs 5.0 g. The flock pad, about 6 cm wide and about 14 cm long, is then carefully halved in thickness, and the two halves are folded open. 0.5 g of active substance (AS) comprising the copolymer to be investigated, in granular form, is then applied to one half. A stencil is used for this, so that the polymer lies on an area 4×8 cm. The other half of the pad is then folded back, and the towel is wound again in a sealable non-woven fabric of dimensions 20×20 cm, the open ends are sealed by the action of heat energy and the projecting non-woven fabric is cut off. Test articles which correspond to a shortened sanitary towel both in respect of shape and in respect of composition are obtained in this manner. Test articles without a copolymer additive are prepared in the same manner. The test articles are subsequently weighed and then immersed in a dish of test liquid for 30 minutes or 3 hours such that they can become saturated without hindrance.

A blood substitute liquid (BS) consisting of 1% strength sodium chloride solution, to which glycerol, sodium bicarbonate and a little hydroxyethylcellulose of average viscosity 20 mPa.s have been added, or a urine substitute liquid (US) is used as the test solution; the urine substitute liquid is likewise a 1% strength sodium chloride solution which contains, as other constituents, urea, secondary ammonium phosphate, potassium sulphate and citric acid.

After the given immersion time, the test articles are freed from non-bonded liquid by brief centrifugation. A commercially available centrifugal laundry dryer with a drum diameter of 23 cm and a speed of 1,400 revolutions/minute is used for this. The test articles are placed on the inner wall of the drum and are centrifuged for 20 seconds with a maximum of 250 times the acceleration of gravity. (The time is calculated from the switching on of the centrifuge to the switching off and includes the start-up time until the full number of revolutions is reached). The test articles are then weighed again.

For better comparison, the retention capacity of one gramme of polymer is calculated as follows:

Retention capacity for BS(US)=(weight of the centrifuged absorbent article with polymer—weight of the centrifuged absorbent article without polymer)×2.

The result is thus given in (g of blood substitute/g of AS-polymer) or (g or urine substitute/g of AS-polymer).

The following table shows the results of the tests in respect of retention capacity for blood substitute and urine substitute solution.

For further comparison, a commercially available hydrophilic synthetic polymer based on polyacrylate has also been tested, under No. 20.

TABLE 2

| Copolymer used from Preparation Example No. | Retention capacity for blood substitute liquid (g of BS/g of AS-polymer) after immersion times of: | | | | Retention capacity for urine substitute liquid (g of US/g of AS-polymer) after immersion times of: | | | |
|---|---|---|---|---|---|---|---|---|
| | 30 minutes | | 3 hours | | 30 minutes | | 3 hours | |
| | Example a | Example b | Example a | Example b | Example a | Example b | Example a | Example b |
| 1 | 30.5 | 24.3 | 43.6 | 29.7 | 35.6 | 28.7 | 43.4 | 40.3 |
| 2 | 30.8 | 30.1 | 45.6 | 41.3 | 29.3 | 26.2 | 40.5 | 38.4 |
| 3 | 28.3 | 26.5 | 39.7 | 35.0 | 33.6 | 28.9 | 44.3 | 41.5 |
| 4 | 37.4 | 34.1 | 46.3 | 43.2 | 30.7 | 25.0 | 35.6 | 30.1 |
| 5 | 39.6 | 34.9 | 50.2 | 48.7 | 45.5 | 39.5 | 54.3 | 49.7 |
| 6 | 31.3 | 21.6 | 45.2 | 40.9 | 37.8 | 26.1 | 55.0 | 58.0 |
| 7 | 34.3 | 30.1 | 43.6 | 39.5 | 34.6 | 26.9 | 56.3 | 54.0 |
| 8 | 30.7 | 27.7 | 44.5 | 41.5 | 40.5 | 24.3 | 49.3 | 44.5 |
| 9 | 28.5 | 22.9 | 42.3 | 39.4 | 45.4 | 39.5 | 50.1 | 40.8 |
| 10 | 35.3 | 28.8 | 50.6 | 52.8 | 48.6 | 33.5 | 77.3 | 76.9 |
| 15 | 33.4 | 29.8 | 45.6 | 38.7 | 42.8 | 37.6 | 53.6 | 48.1 |
| 20 comparison | — | 23.7 | — | 29.8 | — | 26.1 | — | 36.5 |

Similar advantageous effects compared with the particular comparison products from the b-series are achieved with the other crosslinked polymers of the a-series, according to the invention, shown in Table 1.

What is claimed is:

1. In the process for preparation of crosslinked, water-swellable polymers wherein an olefinic monomer or olefinic monomers are polymerized in the presence of a crosslinking agent at temperatures from 0° to 130° C., and the polymerization is initiated by high-energy radiation or chemical catalysts, the improvement comprises said crosslinking agent being 0.001 to 2% by weight, based on monomer to be polymerized, of a compound of the formula

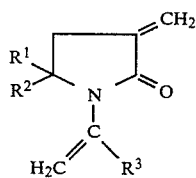

wherein $R^1$, $R^2$ and $R^3$ are identical or different and each is hydrogen or alkyl having 1 to 6 carbon atoms.

2. The process according to claim 1 wherein the cross-linking agent $R^1$, $R^2$ and $R^3$ are identical or different and each is hydrogen or methyl.

3. Copolymers produced by the process according to claim 1.

4. Water-swellable polymers of acrylic acid or acrylic acid ester crosslinked by 0.001 to 2% by weight of a compound of the formula

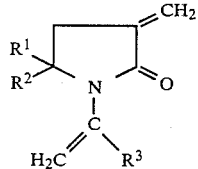

present during polymerization of the acrylic acid or acrylic acid ester wherein $R^1$, $R^2$ and $R^3$ are identical or different and each is hydrogen or alkyl having 1 to 6 carbon atoms.

5. Crosslinked, water-swellable polymers according to claim 4 wherein $R^1$, $R^2$ and $R^3$ are identical or different and each is hydrogen or methyl.

6. Crosslinked, water-swellable polymers according to claim 4 comprising a copolymer of acrylic acid and acrylamide in a weight ratio of (20 to 80):(80 to 20).

7. Crosslinked, water-swellable polymers according to claim 6 wherein $R^1$, $R^2$ and $R^3$ are identical or different and each is hydrogen or methyl.

* * * * *